(12) United States Patent
Kumamoto et al.

(10) Patent No.: US 6,342,270 B1
(45) Date of Patent: Jan. 29, 2002

(54) PROCESS FOR MANUFACTURING A HYDROSTATIC BEARING OF POROUS MATERIAL

(75) Inventors: Satoshi Kumamoto, Mishima; Kuniharu Kawakami, Shizuoka-ken; Keisuke Uchida, Numazu, all of (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 09/338,605

(22) Filed: Jun. 23, 1999

(30) Foreign Application Priority Data

Jun. 24, 1998 (JP) .......................................... 10-177358

(51) Int. Cl.⁷ ................................................ B05D 3/12
(52) U.S. Cl. ........................ 427/289; 427/292; 427/356
(58) Field of Search .................................. 427/289, 290, 427/292, 356.7, 9; 264/629, 678; 29/898.02, 898.06, 898.12, 898.13, 898, 15, 407.05

(56) References Cited

U.S. PATENT DOCUMENTS 3,763,534 A * 10/1973 Conroy et al.
5,730,928 A * 3/1998 Ghosh et al.

FOREIGN PATENT DOCUMENTS

| EP | 0 488 715 | * 3/1992 |
| JP | 63-88317 | 4/1988 |
| JP | 2-256915 | 10/1990 |

* cited by examiner

Primary Examiner—Fred J. Parker
(74) Attorney, Agent, or Firm—Pillsbury Winthrop LLP

(57) ABSTRACT

The object of the present invention is to provide a process for manufacturing a hydrostatic bearing of porous materials with less performance dispersion, at a high rate of productivity. A work piece is comprised of a base member and a housing. The base member is made of porous bronze and set on the front of the housing. A pressure chamber is formed in the rear side of the base material. The work piece is set in a cutting machine, where the surface of the base material is cut with a single crystal diamond bite. Then, molybdenum disulfide is applied together with a binder onto the surface of the base material, and then baked, thus forming a surface restrictor layer. The work piece is set back in the cutting machine, and the surface portion of the surface restrictor layer is cut with the single crystal diamond bite. After the cutting process, compressed air is supplied to the rear side of the surface restrictor layer via the base material. The flow rate of the compressed air is monitored. The depth of cut on the surface portion of the surface restrictor layer of the next cutting is controlled on the basis of the monitored flow rate so as to obtain a desired flow rate.

11 Claims, 2 Drawing Sheets

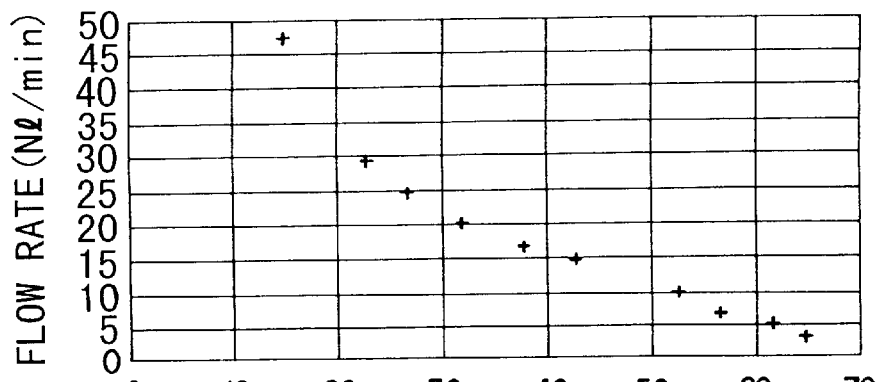
FIG. 4 FLOW RATE VERSUS THE THICKNESS OF THE SURFACE RESTRICTOR
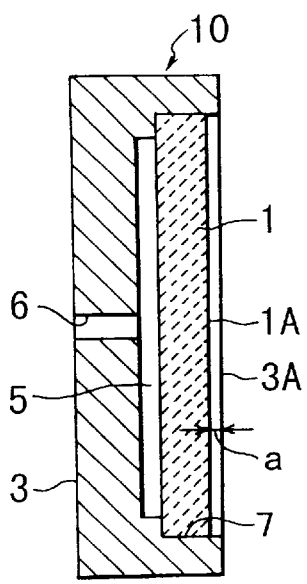
FIG. 5
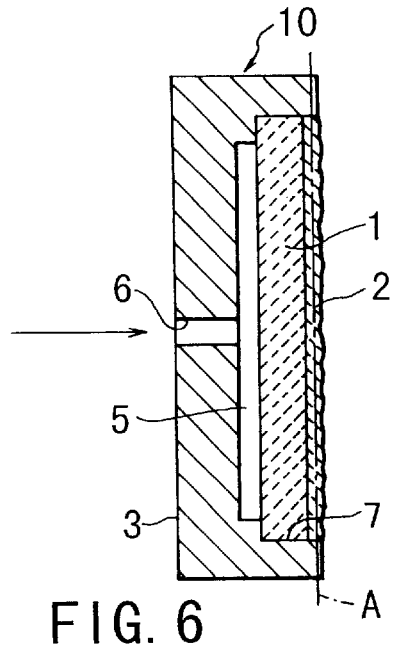
FIG. 6
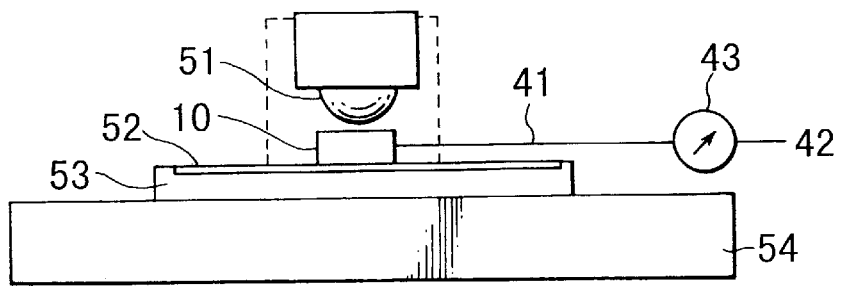
FIG. 7

PROCESS FOR MANUFACTURING A HYDROSTATIC BEARING OF POROUS MATERIAL

BACKGROUND OF THE INVENTION

The present invention relates to a process for manufacturing a hydrostatic bearing of porous material, and more specifically to a process for manufacturing hydrostatic bearings of porous material, with less dispersion in performance.

Recently, when the high accuracy is required in machining, a hydrostatic bearing such as an air spindle or air slider is used. The air spindle is excellent in high speed performance and rotation accuracy, whereas the air slider is excellent in high speed performance and guiding accuracy.

An example of the conventional hydrostatic bearings is an orifice restrictor compensated type hydrostatic bearing, whose air feeding hole for compressed air are made by drilling. However, recently, the hydrostatic bearing made of porous material, is becoming popular. When the bearing surface is made of porous material, innumerable orifices of small diameters can be obtained, and therefore hydrostatic bearings of excellent performance can be manufactured relatively easily.

As the porous material used as raw material for such a hydrostatic bearing, brittle material is used in order to prevent plugging (blinding) of the bearing surface, which can occur during finishing process. Typical examples of the brittle material are carbon, graphite and ceramics.

In the process for manufacturing a hydrostatic bearing of porous material, the bearing surface is sealed with resin partially, to make the diameter of the micropores of the surface layer smaller than that of the base material, in order to prevent the pneumatic hammer (self-induced vibration) due to the compression of air in the pores of the porous material, or to optimize the flow rate by reducing the dispersion in grain diameter of porous material and the non-uniformity of the distribution of the micropores.

For example, Jpn. Pat. Appln. KOKAI Publication No. 63-88317 discloses a process as follows. That is, a porous graphite material is machined to form bearing surface, and resin is impregnated into the bearing surface. Then, part of the resin is removed using solvent while monitoring the flow of air permeating from the bearing surface. Thus, the flow of permeating air is adjusted.

Jpn. Pat. Appln. KOKAI Publication No. 2-256915 discloses another process as follows. That is, the surface of a porous material is immersed into a liquid thermosetting resin. The immersion is carried out until the resin impregnates from the surface to a predetermined depth. After that, the impregnated resin is cured by heat, and thus a surface restrictor layer with micropores being sealed partially, is formed on the surface of the porous material.

However, the former process entails a drawback in productivity in that it requires time and skill to impregnate the resin or to get rid of the resin once impregnated, since the flow rate of permeating air is adjusted by controlling the amount of resin impregnated. The latter process entails a drawback in uniformity of performances of products, that it is not always easy to control the depth of the impregnation of the resin to be constant.

BRIEF SUMMARY OF THE INVENTION

The present invention has been achieved as a solution to the drawbacks of the conventional processes for manufacturing hydrostatic bearing of porous material, and the object thereof is to provide a process for manufacturing a hydrostatic bearing, which has a high productivity and less dispersion in performance.

According to the present invention, there is provided a process for manufacturing a hydrostatic bearing of porous material for supporting a movable member with hydrostatic pressure of fluid fed from a bearing surface, the process comprising the steps of:

machining a surface of a base member made of a first porous material;

covering the surface of the base member with a surface restrictor layer made of a second porous material having micropores of a cross sectional area smaller than that of the base member; and removing a surface portion of the surface restrictor layer by machining, to form bearing surface;

wherein the depth of machining of the surface portion of the surface restrictor layer is controlled such that flow of the fluid fed from the bearing surface is adjusted to a target value.

According to the process of the present invention, the surface restrictor layer serves to control the flow rate of the fluid passing therethrough. Consequently, the thickness of the surface restrictor layer can be controlled more accurately by machining, because the flow of liquid fed from the bearing surface can be accurately adjusted, by measuring the flow rate, to achieve a target value.

In the case where porous material made of non-ferrous metal such as bronze is used as the first porous material for the base member, it is preferable that the surface of the base member should be finished by cutting with single crystal diamond bite. Therefore, the surface of the base member can be finished without plugging (blinding) of the surface.

In the case where porous material made of brittle material such as ceramic is used as the first porous material for the base member, the surface of the base member is finished by grinding or lapping. Therefore, the surface of the base member can be finished without plugging of the surface.

In the case where porous material made of solid lubricant such as molybdenum disulfide or carbon is used as the second porous material for the surface restrictor layer, it is preferable that the surface portion of the surface restrictor layer should be machined by, grinding, lapping or cutting with use of a single crystal diamond bite. Therefore, the surface portion of the surface restrictor layer can be finished without plugging of the surface.

In the case where porous material made of brittle material such as ceramic is used as the second porous material for the surface restrictor layer, it is preferable that the surface portion of the surface restrictor layer should be machined by grinding or lapping. Therefore, the surface portion of the surface restrictor layer can be finished without plugging of the surface.

It is preferable that while the surface portion of the surface restrictor layer is being machined, compressed gas is supplied to the rear side of the surface restrictor layer via the base member, and the flow of the compressed gas fed via the surface restrictor layer is measured. On the basis of the flow rate of the compressed gas thus measured, the depth of machining is controlled. In this manner, it becomes possible to accurately adjust the flow of the fluid fed from the bearing surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a graph indicating an example of the correlation between the thickness of the surface restrictor layer and the flow rate of the compressed air permeating therethrough;

FIG. 5 is a cross section of a work piece before being covered with a surface restrictor layer, by another example of the manufacturing process of the present invention;

FIG. 6 is a cross section of a work piece after being covered with a surface restrictor layer, by this example of the manufacturing process of the present invention; and FIG. 7 is a schematic diagram showing the structure of a grinding machine used in another process for manufacturing a hydrostatic bearing of porous material, according to the present invention.

DETAILED DESCRIPTION OF THE INVENTION

Embodiments of the process for manufacturing a hydrostatic bearing, according to the present invention will now be described with reference to drawings.

Figure 1:
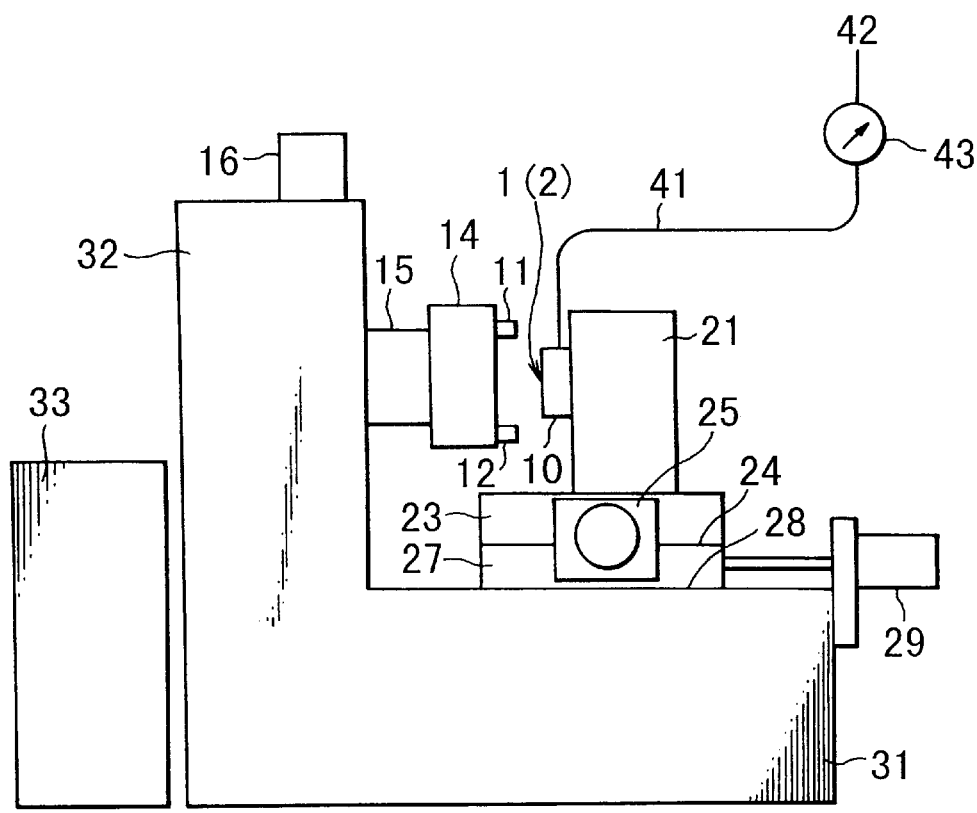
FIG. 1 is a schematic diagram showing the structure of a cutting machine used in a process for manufacturing a hydrostatic bearing of porous material, according to the present invention.

FIG. 1 shows a schematic diagram of a cutting machine used for cutting the base member and surface restrictor layer, in the manufacturing process of the present invention. In this cutting machine, a single crystal diamond bite is used.

A cutting tool 11 is made of a single crystal diamond bite, and set on the distal end of a spindle 15 via a tool holder 14. Further, a dummy 12 is set on the tool holder 14 at a position diagonally opposing the cutting tool 11. The dummy 12 is used to keep the balance of the spindle while rotation. The spindle 15 is supported by a column 32 via a static air bearing (not shown), and the position of the spindle 15 in the Y-axial direction (that is, vertical direction) is controlled in a feedback manner by a Y-axial servo motor 16 set on the column 32.

A work piece holder 21 is provided in front of the tool holder 14, and a work piece 10 is held on the front surface of the work piece holder 21. The work piece holder 21 is fixed onto an X-axial table 23, which is supported slidably on a Z-axial table 27 by an air slider 24. Further, the Z-axial table 27 is supported slidably on a base 31 by an air slider 28. The position of the X-axial table 23 in the X-axial direction (that is, the perpendicular direction to the surface of the sheet in FIG. 1) is controlled in a feedback manner by an X-axial servo motor 25 provided on the Z-axial table 27 and an optical scale (not shown). Similarly, the position of the Z-axial table 27 in the Z-axial direction (that is, the axial direction of the spindle 15) is controlled in a feedback manner by an Z-axial servo motor 29 provided on the base 31 and an optical scale (not shown). The movement of each axis is controlled by a numerical control unit 33.

Further, in the actual practice of the manufacturing process of the present invention, an air pipe 41 is provided for feeding compressed air to the work piece 10 held on the work piece holder 21. The air pipe 41 is connected to an air source 42, and a flow meter 43 is provided in the middle of the air tube 41.

An example of the process for manufacturing a hydrostatic bearing of porous material with use of a cutting machine shown in FIG. 1 will now be described.

Figure 2:
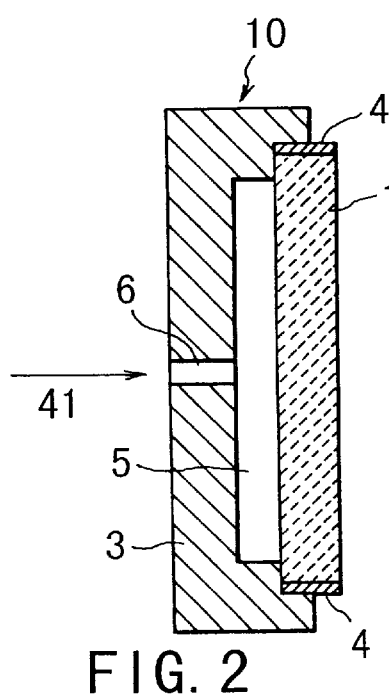
FIG. 2 is a cross section of a work piece before being covered with a surface restrictor layer, by an example of the manufacturing process of the present invention.

First, as a work piece 10, a semi-processed product as shown in FIG. 2 is prepared. The work piece 10 is prepared by mounting a plate made of porous bronze, which constitute a base member 1, on the front surface of a housing 3. The periphery of the base member 1 is adhered to the housing 3 via a sealing layer 4. Between the rear surface of the base member 1 and the housing 3, a pressure chamber 5 which contains compressed air is formed. In the housing 3, an air feeding hole 6 for supplying compressed air to the pressure chamber 5 is provided.

The work piece 10 shown in FIG. 2 is set on the work piece holder 21 (FIG. 1) such that the base member side faces front, and then, the spindle 15 is started to be driven. The position of the X axis is determined in advance so that the work piece 10 and the cutting tool 11 do not interfere with each other. The Z-axial table 27 is moved by a predetermined stroke so as to determine the depth of cut. After the rotation of the spindle 15 reaches a stationary value, the X-axial table 23 is driven to cut the surface of the work piece 10. The cutting process is carried out on the above-described cutting machine and with use of the cutting tool 11 consisting of single crystal diamond bite, and in this manner, the surface of the base member 1 (the front surface of the work piece 10) can be finished without plugging of the surface.

Figure 3:
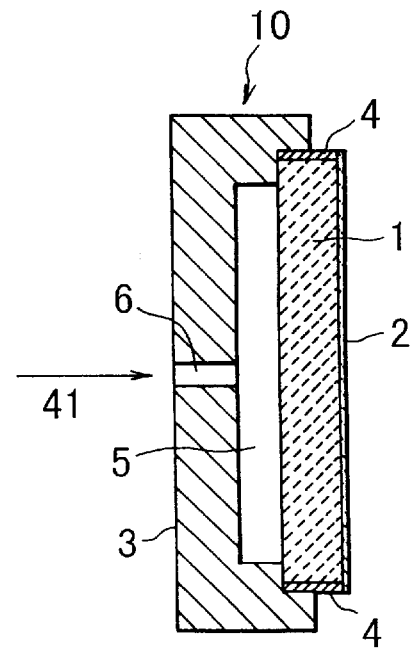
FIG. 3 is a cross section of a work piece after being covered with a surface restrictor layer, by an example of the manufacturing process of the present invention.

Then, the work piece 10 which has been subjected to the surface finishing of the base member 1, is once removed from the cutting machine. Outside the cutting machine, molybdenum disulfide which is solid lubricant is applied together with binder on the surface of the base member 1, and baked thereon, thus forming a surface restrictor layer 2 (before being machined). FIG. 3 shows the state of the work piece 10 after the surface restrictor layer 2 is formed.

Subsequently, the work piece 10 is set back to the work piece holder 21 of the cutting machine. While supplying compressed air to the rear side of the base member 1 via the air pipe 41, the surface portion of the surface restrictor layer 2 is cut with use of the cutting tool 11 consisting of the single crystal diamond bite. After each cutting step, the flow rate of the compressed air is measured with the flow meter 43, and the depth of cut of the next cutting step is determined such as to adjust the flow rate to a predetermined value.

In the case of the above-described method, the depth of cut can be controlled to 0.1 $\mu$m or less per one stroke in the Z direction. Therefore, the flow rate of the compressed air which permeates through the bearing surface can be accurately adjusted. As a result, hydrostatic bearings of uniform performance can be manufactured easily.

FIG. 4 shows an example of the correlation between the thickness of the surface restrictor layer 2 and the flow rate of the permeating air, which was obtained by repeating the cutting step on the surface restrictor layer 2 and the measurement of the flow rate of the compressed air permeating therethrough.

FIGS. 5 and 6 shows another example of the process for manufacturing a hydrostatic bearing, according to the present invention. As in the previous example, the surface of the base member 1 is finished by cutting with the cutting tool 11 consisting of the single crystal diamond bite. Then, as shown in FIG. 5, the base member 1 is inserted to a counterbore 7 and fixed therein, such that the surface 1A of the base member is leveled lower than the surface 3A of the housing by a predetermined amount a.

Then, as shown in FIG. 6, molybdenum disulfide, which is solid lubricant, is applied together with binder, onto the surface of the base member 1 such as to fill the inside of the counterbore 7, and then baked, thus forming a surface restrictor layer 2.

Subsequently, the surface portion of the surface restrictor layer 2 is machined as in the previous embodiment. In this embodiment, as indicated by chain line A in FIG. 6, the surface restrictor layer 2 and the surface of the housing 3 are machined at the same time, and they are leveled with each other in the same plane. Thus, in order to machine the surface of the housing 3 and the surface restrictor layer 2 at the same time, the grinding or lapping is employed.

The surface restrictor layer 2 may be made of a brittle material such as ceramic, in place of molybdenum disulfide or carbon used in the above embodiment. In this case, the surface of the base member 1 is finished, and then a surface restrictor layer 2 made of porous material such as ceramic, is formed on the surface of the base member 1, as in the previous embodiment. The surface portion of the surface restrictor layer 2 is machined by grinding. It should be noted that the machining process of the surface portion of the surface restrictor layer 2 may include grinding which is carried out up to half-finishing state and lapping to finish the process.

FIG. 7 shows a schematic diagram of the grinding machine used in the above-described method. A work piece 10 (FIG. 2) is mounted on a table 53 via a chuck 52. The table 53 is supported on a base 54. A grinding wheel 51 is set above the work piece 10. To the housing 3 (see FIG. 2) which constitutes a part of the work piece 10, an air pipe 41 is connected as in the previous embodiment. The air pipe 41 is connected to the air source 42, and a flow meter 43 is provided in the middle of the air pipe 41.

According to the process of the present invention, hydrostatic bearing of porous materials of uniform performance can be easily manufactured. Consequently, a hydrostatic bearing of porous material having high rigidity, high-speed performance, and low air consumption, can be manufactured at lower cost than that of the conventional case.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A process for manufacturing a hydrostatic bearing of porous material for supporting a movable member with static pressure of fluid fed from a bearing surface comprising:

machining a surface of a base member made of a first porous material;

plating a surface restrictor layer on the surface of the base member, said surface restrictor layer serving to control the flow rate of fluid therethrough, and being made of a second porous material having micropores of a cross sectional area smaller than those of the base member; and removing a surface portion of the surface restrictor layer by machining, to form an outside bearing surface, wherein the depth of machining of the surface portion of the surface restrictor layer is controlled such that flow of the fluid fed from the base member to the outside bearing surface coincides with a predetermined value.

2. A process for manufacturing a hydrostatic bearing of porous material, according to claim 1, wherein the first porous material, which constitutes the base member, is a porous material made of non-ferrous metal, and the surface of the base member is cut with a single crystal diamond bite.

3. A process for manufacturing a hydrostatic bearing of porous material, according to claim 2, wherein the first porous material, which constitutes the base member, is a porous material made of bronze.

4. A process for manufacturing a hydrostatic bearing of porous material, according to claim 1, wherein the first porous material, which constitutes the base member, is a porous material made of a brittle material and the surface of the base member is machined by grinding or lapping.

5. A process for manufacturing a hydrostatic bearing of porous material, according to claim 4, wherein the first porous material, which constitutes the base member, is a porous material made of ceramic.

6. A process for manufacturing a hydrostatic bearing of porous material, according to claim 1, wherein the second porous material which constitutes the surface restrictor layer is a porous material made of solid lubricant, and the surface of the surface restrictor layer is machined by grinding, lapping or cutting with use of a monocrystal diamond bite.

7. A process for manufacturing a hydrostatic bearing of porous material, according to claim 6, wherein the second porous material which constitutes the surface restrictor layer is made by applying molybdenum disulfide together with binder, on the base member, followed by baking.

8. A process for manufacturing a hydrostatic bearing of porous material, according to claim 6, wherein the second porous material which constitutes the surface restrictor layer is made by applying carbon together with binder, on the base member, followed by baking.

9. A process for manufacturing a hydrostatic bearing of porous material, according to claim 1, wherein the second porous material which constitutes the surface restrictor layer is a porous material made of brittle material, and the surface of the surface restrictor layer is machined by grinding or lapping.

10. A process for manufacturing a hydrostatic bearing of porous material, according to claim 9, wherein the second porous material which constitutes the surface restrictor layer is made by applying ceramic together with binder, on the base member, followed by baking.

11. A process for manufacturing a hydrostatic bearing of porous material, according to claim 10, wherein;

compressed air is supplied to the surface restrictor layer via the base member while the surface portion of the surface restrictor layer is machined;

a flow rate of the compressed air fed via the surface restrictor layer is measured; and a depth of machining the surface portion of the surface restrictor layer is controlled on the basis of the measured flow rate.

* * * * *